(12) United States Patent
Chen et al.

(10) Patent No.: US 10,121,095 B2
(45) Date of Patent: Nov. 6, 2018

(54) METHOD AND DEVICE FOR RECOGNIZING SUBJECT AREA OF IMAGE

(71) Applicant: BAIDU ONLINE NETWORK TECHNOLOGY (BEIJING) CO., LTD., Beijing (CN)

(72) Inventors: Shijia Chen, Beijing (CN); Xubin Li, Beijing (CN); Shilei Wen, Beijing (CN); Yinan Yu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/322,466

(22) PCT Filed: Jun. 23, 2015

(86) PCT No.: PCT/CN2015/082049
§ 371 (c)(1),
(2) Date: Dec. 28, 2016

(87) PCT Pub. No.: WO2016/107103
PCT Pub. Date: Jul. 7, 2016

(65) Prior Publication Data
US 2017/0293824 A1    Oct. 12, 2017

(30) Foreign Application Priority Data

Dec. 30, 2014 (CN) .......................... 2014 1 0850511

(51) Int. Cl.
*G06K 9/62* (2006.01)
*G06F 17/30* (2006.01)
*G06K 9/32* (2006.01)

(52) U.S. Cl.
CPC ....... *G06K 9/6267* (2013.01); *G06F 17/3028* (2013.01); *G06F 17/30256* (2013.01); *G06K 9/3233* (2013.01); *G06K 9/6211* (2013.01)

(58) Field of Classification Search
CPC ............... G06K 9/6267; G06K 9/6211; G06K 9/00362; G06T 2207/30196;
(Continued)

(56) References Cited

U.S. PATENT DOCUMENTS 7,899,644 B2 * 3/2011 Weber .................... F41H 11/02
340/945
8,045,759 B2 * 10/2011 Mizutani ............ G06K 9/00362
382/103
(Continued)

FOREIGN PATENT DOCUMENTS

CN         1635547 A    7/2005
CN       101350063 A    1/2009
(Continued)

OTHER PUBLICATIONS

Japanese Patent Application No. 2017501172 Office Action dated Jan. 16, 2018, 3 pages.
(Continued)

*Primary Examiner* — Ali Bayat
(74) *Attorney, Agent, or Firm* — Lathrop Gage LLP

(57) ABSTRACT

A method and a device for recognizing a subject area of an image are provided. The method includes receiving an image to be recognized, and extracting a candidate subject area from the image; eliminating a non-subject area from the extracted candidate subject areas to obtain a target candidate subject area, and adjusting and classifying the target candidate subject areas to obtain at least one set of the target candidate subject areas; and merging the target candidate
(Continued)

subject areas in each set of the target candidate subject areas to recognize the subject area of the image.

11 Claims, 3 Drawing Sheets

(58) Field of Classification Search
CPC . G06T 2207/30261; G06T 7/593; G06T 7/70; G06F 17/30256; G06F 17/3028
See application file for complete search history.

(56) References Cited

U.S. PATENT DOCUMENTS

| | | | | |
|---|---|---|---|---|
| 2004/0189995 | A1* | 9/2004 | Tanaka | G03F 9/7003 356/401 |
| 2008/0056534 | A1* | 3/2008 | Kigasawa | G06T 7/70 382/103 |
| 2014/0201126 | A1* | 7/2014 | Zadeh | G06K 9/627 706/52 |

FOREIGN PATENT DOCUMENTS

| | | |
|---|---|---|
| CN | 101388071 A | 3/2009 |
| CN | 101408942 A | 4/2009 |
| CN | 101510309 A | 8/2009 |
| CN | 101894361 A | 11/2010 |
| CN | 102013021 A | 4/2011 |
| CN | 102622761 A | 8/2012 |
| CN | 103955718 A | 7/2014 |
| CN | 104573715 A | 4/2015 |
| JP | 2010039968 A | 2/2010 |
| JP | 2013011950 A | 1/2012 |
| JP | 2012022412 A | 2/2012 |

OTHER PUBLICATIONS

Japanese Patent Application No. 2017501172 English translation of Office Action dated Jan. 16, 2018, 3 pages.
Chinese Patent Application No. 201410850511.2 First Office Action dated May 10, 2016 with English translation, 10 pages.
Chinese Patent Application No. 201410850511.2 Second Office Action dated Dec. 1, 2016 with English translation, 9pages.
Chinese Patent Application No. 201410850511.2 Third Office Action dated Apr. 5, 2016 with English translation, 7 pages.
PCTCN2015082409 International Search Report & Written Opinion dated Sep. 25, 2015, with English translation, 21 pages.

* cited by examiner

METHOD AND DEVICE FOR RECOGNIZING SUBJECT AREA OF IMAGE

CROSS-REFERENCE TO RELATED APPLICATIONS

This application is a national phase entry under 35 USC § 371 of International Application PCT/CN2015/082049, filed Jun. 23, 2015, which claims priority to and benefits of Chinese Patent Application Serial No. 201410850511.2, titled with "a method and an apparatus for recognizing a subject area of an image" and filed with the State Intellectual Property Office of P.R. China on Dec. 30, 2014 by Baidu Online Network Technology (Beijing) Co., Ltd., the entire content of each is incorporated herein by reference.

FIELD

The present disclosure relates to the field of computer techniques, and more particular to a method for recognizing a subject area of an image and an apparatus for recognizing a subject area of an image.

BACKGROUND

At present, an extraction of image information is mainly concentrated on three granularity levels, which includes a coarse-grained classification and annotation of image for taking an entire image as a unit, and an object detection way for obtaining a physical object (such as a pedestrian, a human face, a car and so on) in an image, which requires specialized detectors trained for detecting, and also includes a fine-grained image segmentation and analysis on pixel scale, which may give a granularity description of image subject details on pixel scale. However, pluralities of problems are contained in the above image processing ways based on three granularity levels. The problems are that, an inaccurate and incomplete analysis of an image with a plurality of subjects may be given by an image classification and annotation such that analysis results obtained are instable, an image with a plurality of subjects of different classifications requires traversing more than once such that the object detection way causes a large calculation, and an image segmentation and analysis takes a long time to analyze, which is applicable to particular scenarios such as segmentation of human faces, clothes, skin and luggage.

With development of internet technology, the above image processing ways based on single granularity cannot satisfy demands of more diversity of web pictures and social pictures. In order to adapt to development of times, an image processing procedure in the related art includes: detecting a subject area where a subject is located in an image, and performing a subsequent analysis of the subject based on the subject area, for example, classifying or recognizing the subject. In this whole procedure, it is key to obtain a precise analysis result of the image for the obtaining of the subject areas of the image. There are two common ways for detecting the subject areas of the image. The first way is a way for detecting the subjects based on a significant area, which performs a processing of the image via a significant energy function to generate an energy distribution curve of an image, and obtains a more significant area according to the energy distribution curve such that the area is taken as the subject area of the image. The second way is a subject coordinate regression based on depth studying, which obtains the image to be processed, and predicts four point coordinates of an external rectangle based on subject via a trained deep neural network to detect the location of the subject areas.

However, problems of the above ways are that, it is not general that the significant energy function is used in the first way and the detection result of the subject areas in the first way lacks accuracy and validity that the subject areas; and in the second way, not only is it complicated for calculation and is it poor for timeliness effect, but also just one subject area is returned, which makes it difficult to process the image with a plurality of subjects.

SUMMARY

Embodiments of the present disclosure seek to solve at least one of the problems existing in the related art to at least some extent. Accordingly, embodiments of a first aspect of the present disclosure provide a method for recognizing a subject area of an image, which may precisely obtain the subject area of the image, and may recognize a plurality of subject areas corresponding to the subjects in an image with a plurality of subjects.

Embodiments of a second aspect of the present disclosure provide an apparatus for recognizing a subject area of an image.

Embodiments of a third aspect of the present disclosure provide a storage medium.

Embodiments of a fourth aspect of the present disclosure provide a device for recognizing a subject area of an image.

In order to achieve above objectives, according to embodiments of a first aspect of the present disclosure, a method for recognizing a subject area of an image is provided. The method includes receiving an image to be recognized and extracting a candidate subject area from the image, eliminating a non-subject area from the extracted candidate subject areas to obtain a target candidate subject area, adjusting and classifying the target candidate subject areas to obtain at least one set of the target candidate subject areas, and merging the target candidate subject areas in each set of the target candidate subject areas to recognize the subject area of the image.

With the method for recognizing the subject area of the image according to embodiments of the present disclosure, the candidate subject areas are firstly extracted from the image to be recognized, and then, the non-subject areas are eliminated from the extracted candidate subject areas such that the target candidate subject areas are obtained, and the target candidate subject areas are adjusted and classified such that at least one set of the target candidate subject areas is obtained, at last, the target candidate subject areas in each set of target candidate subject areas are merged such that the subject area of the image is recognized, thereby precisely obtaining the subject area of the image, and recognizing the subject areas corresponding to subjects in the image with a plurality of the subjects.

In order to achieve above objectives, according to embodiments of a second aspect of the present disclosure, an apparatus for recognizing a subject area of an image is provided. The apparatus includes an extracting module configured to receive an image to be recognized and extract a candidate subject area from the image; a processing module configured to eliminate a non-subject area from the extracted candidate subject areas to obtain a target candidate subject area and to adjust and classify the target candidate subject areas to obtain at least one set of target candidate subject areas; and a merging module configured to merge the target candidate subject areas in each set of the target candidate subject areas to recognize the subject area of the image.

With the apparatus for recognizing the subject area of the image according to embodiments of the present disclosure, the extracting module extracts the candidate subject areas from the image to be recognized, and then, the processing module eliminates the non-subject areas from the extracted candidate subject areas such that the target candidate subject areas are obtained and adjusts and classifies the target candidate subject areas such that at least one set of the target candidate subject areas is obtained, at last, the target candidate subject areas in each set of target candidate subject areas are merged such that the subject area of the image is recognized, thereby precisely obtaining the subject area of the image, and recognizing the subject areas corresponding to subjects in the image with a plurality of the subjects.

In order to achieve above objectives, according to embodiments of a third aspect of the present disclosure, a storage medium for storing an application program is provided. The application program is configured to execute the method for recognizing a subject area of an image according to embodiments of a first aspect of the present disclosure.

In order to achieve above objectives, according to embodiments of a fourth aspect of the present disclosure, a device for recognizing a subject area of an image is provided. The device includes one or more processors, a memory and one or more modules. The one or more processors are stored in the memory and configured to perform following operations if the one or more modules are executed by the one or more processors: receiving an image to be recognized and extracting a candidate subject area from the image, eliminating a non-subject area from the extracted candidate subject area to obtain a target candidate subject area, adjusting and classifying the target candidate subject areas to obtain at least one set of the target candidate subject areas, and merging the target candidate subject areas in each set of target candidate subject areas to recognize the subject area of the image.

DETAILED DESCRIPTION

Figure 1:
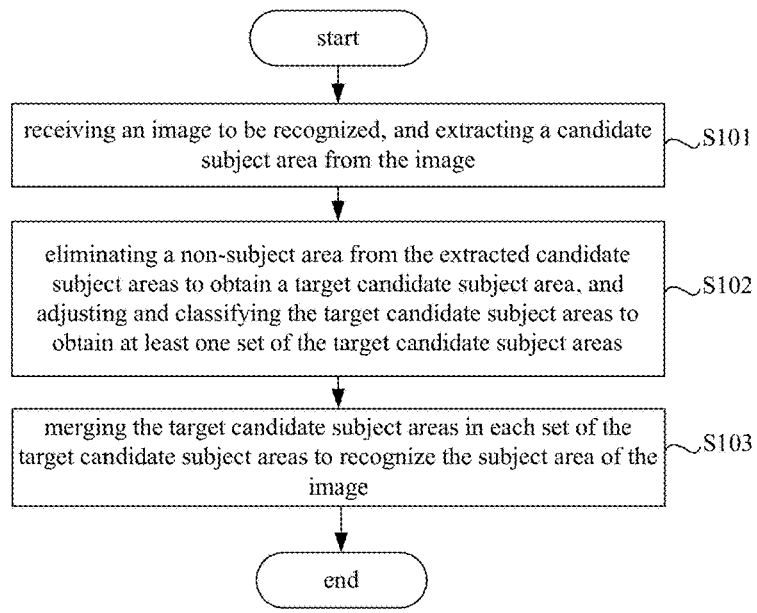
FIG. 1 is a flow chart of a method for recognizing a subject area of an image according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

A method for recognizing a subject area of an image and an apparatus for recognizing a subject area of an image according to embodiments of the present disclosure will be described below with reference to the drawings.

FIG. 1 is a flow chart of a method for recognizing a subject area of an image according to an embodiment of the present disclosure. As shown in FIG. 1, the method includes following steps.

In step S101, an image to be recognized is received and a candidate subject area is extracted from the image.

Specifically, using common subject detection models, candidate subject areas with different sizes and length-width ratios are extracted from the image to be recognized. In order to make the candidate subject areas cover various subjects of different classifications and different sizes in the image, the common subject detection models may generally obtain a plurality of candidate subject areas of the image and may show the candidate subject areas with rectangular frames.

The common subject detection model is a model for extracting candidate subject areas of the image, which may extract characteristics of the image according to predefined image characteristics (such as pixel grey, color, image gradient, edge, Histogram of Oriented Gradient characteristic and Local Binary Pattern characteristic). After the characteristics of the image are extracted, an analysis of the obtained characteristics is performed by a machine learning algorithm for the image (such as support vector machine (svm) and Adaboost algorithm (it is an adaptive ensemble learning algorithm) and a random forest algorithm) such that the candidate subject areas corresponding to the image to be recognized are obtained. It should be noted that the candidate subject areas are efficiently extracted by the model, which takes 100 ms to extract the candidate subject areas of an image, normally.

In step S102, a non-subject area is eliminated from the extracted candidate subject areas to obtain a target candidate subject area, and the target candidate subject areas are adjusted and classified to obtain at least one set of the target candidate subject areas.

In this embodiment, after obtaining the plurality of candidate subject areas from the image to be recognized, classifier with different levels are configured to recognize the extracted candidate subject areas such that the non-subject area are eliminated from the extracted candidate subject areas.

Specifically, after obtaining the plurality of candidate subject areas from the image to be recognized, in order to precisely obtain the subject area of the image, classifications of the obtained candidate subject areas may be performed by classifier with different levels such that the non-subject areas are eliminated gradually from the extracted candidate subject areas. There are different criteria according to classifiers with different levels. There is a high possibility that the candidate subject areas which satisfy all criteria become the subject area of the image.

For example, it is assumed that there are three cascade classifiers herein, after obtaining the plurality of candidate subject areas corresponding to the current image, the first level depth learning classifier where the candidate subject areas are inputted performs a recognition of the candidate subject areas according to its criterion such that the non-subject areas that do not satisfy characteristics of subject areas are eliminated. Then, a second level depth learning classifier where the obtained recognition results are inputted performs a further elimination of the non-subject areas that do not satisfy the characteristics of the subject areas according to its criterion and outputs the corresponding recognition results. The recognition results are inputted into a third level linear classifier. The linear classifier is also called Support Vector Machine (SVM), which performs a recognition of the results according to its criterion such that the non-subject areas which do not satisfy the criterion are further eliminated, and outputs the recognition results which is taken as the candidate subject areas that satisfy all criteria. Herein, in order to quickly filter the non-subject areas, a coarse filtration of the candidate subject areas is performed via the low-level classifiers firstly, and then in order to precisely eliminate few of non-subject areas that are difficult to recognize from the candidate subject areas, the high-level classifiers are used to obtain the precise corresponding target candidate subject areas. The candidate subject areas that satisfy all criteria are taken as the target candidate subject areas.

After obtaining the candidate subject areas, in order to precisely obtain the subject area of the images, for each target candidate subject area, a current target candidate subject area is zoomed and/or panned according to the relations of sizes and of locations between a subject and the current target candidate subject area.

After adjusting each target candidate subject area, a grade and a classification of each unadjusted target candidate subject area and each adjusted target candidate subject area are obtained respectively, the corresponding target candidate subject areas are sorted according to the grades of the target candidate subject areas in the same classification, and the set of target candidate subject areas is obtained according to the sorting result.

For example, a classifier based on a depth learning model performs a classification of each target candidate subject area where the obtained unadjusted target candidate subject areas and the obtained adjusted target candidate subject areas are contained, and outputs probability values that each target candidate subject area belongs to each classification. It is assumed that there are four target candidate subject areas in total, which are represented as a, b, c and d respectively, and there are three kinds of classifiers which are represented as 1, m and n respectively. The probability distributions of target candidate subject areas corresponding to the classifiers 1, m and n are as follows: the probability distribution of a is (0.1, 0.1, 0.8), the probability distribution of b is (0.2, 0.2, 0.6), the probability distribution of c is (0.7, 0.1, 0.2), the probability distribution of d is (0.1, 0.85, 0.05). Then, for each classification, the target candidate subject areas are sorted according to their probability values and the classifications corresponding to the target candidate subject areas are obtained according to the sorting result. A processing of the above four target candidate subject areas a, b, c and d is performed, and thus the obtained result is as follows: a and b belong to classification n, the probability value of a is higher (a high confidence) to row in front of b, besides, c belongs to classification 1, and d belongs to classification m.

In step S103, the target candidate subject areas in each set of the target candidate subject areas are merged to recognize the subject area of the image.

In this embodiment, after obtaining at least one set of the target candidate subject areas corresponding to the image, the target candidate subject areas in each set of the target candidate subject areas are merged according to the relations of sizes and of locations between the target candidate subject areas.

For example, it is assumed that there are two kinds of sets of target candidate subject areas herein. For each set, the target candidate subject areas are merged according to the relations of sizes and of locations between the target candidate subject areas. Specifically, while the target candidate subject areas in the same classification are merged, if there is an overlapping area between two target candidate subject areas, the two areas may be merged according to their circumscribed rectangles. In addition, in the procedure of merging, the machine learning algorithm in which the clustering algorithm of subject frame and the classification algorithm of subject frame based on the model of conditional random fields are contained is used to merge the target candidate subject areas such that the subject areas corresponding to the two kinds of subjects are obtained in the image.

The method for recognizing the subject area of the image according to the embodiment may precisely obtain the subject areas corresponding to the subjects in the image, and may obtain the relations of locations of the subject areas in the image, thereby making the subsequent operations easy, the subsequent operations including classifying, recognizing, cutting and searching the image based on the obtained subject areas. In addition, the method may cut the image according to the subject area of the image, and may put the cut images into the searching result webpage such that the searching results may be shown full of facts and images.

With the method for recognizing the subject area of the image according to embodiments of the present disclosure, the candidate subject areas are firstly extracted from the image to be recognized, and then, the non-subject areas are eliminated from the extracted candidate subject areas such that the target candidate subject areas are obtained, afterwards, the target candidate subject areas are adjusted and classified such that at least one set of target candidate subject areas is obtained, at last, the target candidate subject areas in each set of the target candidate subject areas are merged respectively such that the subject area of the image are obtained, thereby precisely obtaining the subject area of the image and recognizing the subject areas corresponding to the subjects in the image with a plurality of subjects.

Figure 2:
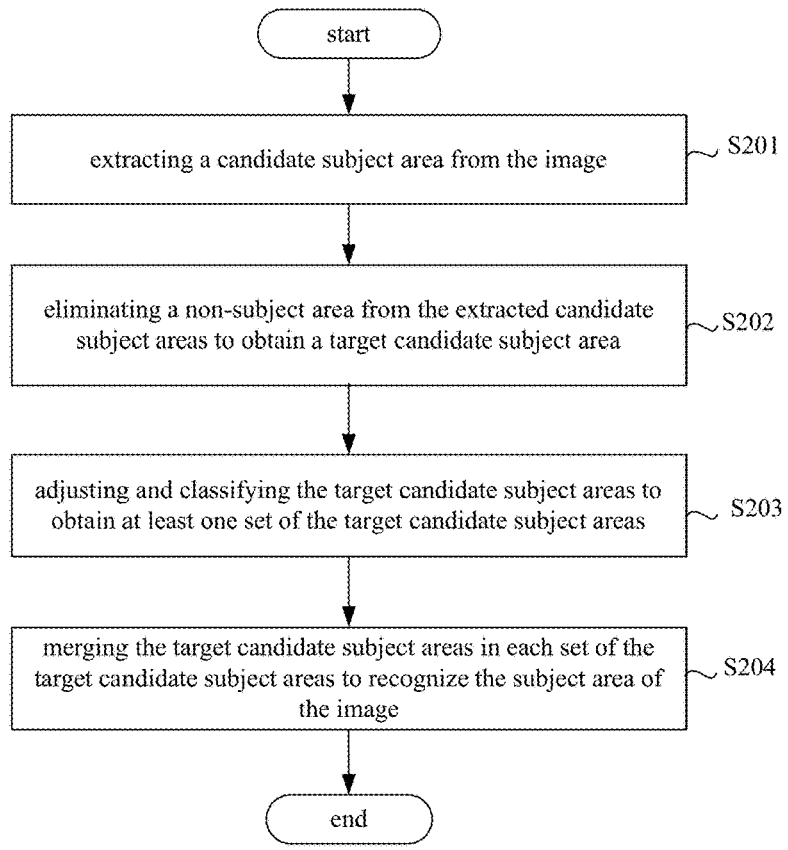
FIG. 2 is a flow chart of a method for recognizing a subject area of an image according to an embodiment of the present disclosure.

FIG. 2 is a flow chart of a method for recognizing a subject area of an image according to another embodiment of the present disclosure. The embodiment of recognizing procedure of the subject area of the image is described in detail by taking a picture shown in FIG. 3 as an example. As shown in FIG. 2, the method for recognizing the subject area of the image includes following steps.

In step S201, a candidate subject area is extracted from an image.

Figure 3:
FIG. 3 is a sample graph of an original image without being processed.

Specifically, the candidate subject areas with different sizes and length-width ratios are extracted from the image shown in FIG. 3 by a common subject detection model. The result of extracting the candidate subject areas from the image is shown in FIG. 4, areas framed by rectangles are the candidate subject areas, and each rectangle represents a candidate subject area.

The common subject detection model is a model for extracting candidate subject areas of an image. The candidate subject areas are efficiently extracted by the model, which takes 100 ms to extract the candidate subject areas from an image, generally.

In step S202, a non-subject area is eliminated from the extracted subject areas to obtain a target candidate subject area.

Figure 4:
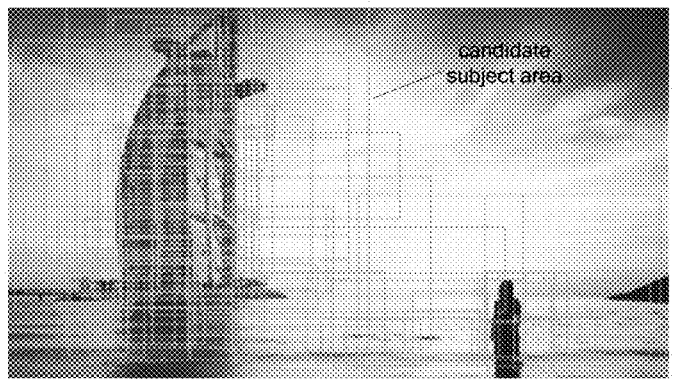
FIG. 4 is a sample graph of a result of extracting candidate subject areas from the image shown in FIG. 3.

As shown in FIG. 4, there are a plurality of candidate subject areas. In order to precisely obtain the subject area of the image, the plurality of extracted candidate subject areas are recognized via cascade classifiers with different levels, and the non-subject areas are gradually eliminated from the candidate subject areas such that the target candidate subject areas are obtained. There is a high possibility that the candidate subject areas which satisfy all criteria become the subject area of the image. The candidate subject areas that satisfy the criteria of all classifiers are also called the target candidate subject areas.

Figure 5:
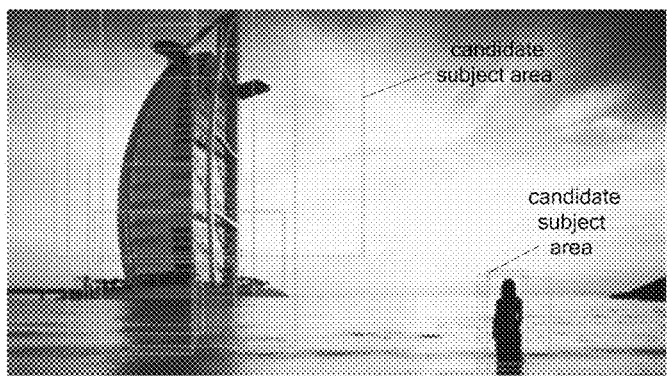
FIG. 5 is a sample graph of a result of eliminating a non-subject area from the candidate subject areas shown in FIG. 4.

Specifically, while the image shown in FIG. 4 is processed, there are two subjects contained in the image. Therefore, the non-subject areas may be eliminated via multi-level binary classifiers from the candidate subject areas corresponding to the two subjects. The result of eliminating the non-subject areas from the candidate subject areas is shown in FIG. 5. By comparing FIG. 4 with FIG. 5, it can be seen in FIG. 5 that there are only a few candidate subject areas (i.e. the target candidate subject areas) that may become the subject area of the image.

In step S203, the target candidate subject areas are adjusted and classified to obtain at least one set of target candidate subject areas.

In this embodiment, after obtaining the target candidate subject areas, in order to precisely obtain the subject area of the image, for each target candidate subject area, a current target candidate subject area is zoomed and/or panned according to the relations of sizes and of locations between a subject and the current target candidate subject area.

As shown in FIG. 5, there are some deviations between the target candidate subject areas and the subject area of the image. In order to precisely obtain the subject area of the image, the target candidate subject areas shown in FIG. 5 are adjusted. Specifically, each target candidate subject area shown in FIG. 5 is zoomed and/or panned according to the relations of sizes and of locations between the subjects and the current target candidate subject areas such that new target candidate subject areas are generated.

After adjusting each target candidate subject area, a grade and a classification of each unadjusted target candidate subject area and each adjusted target candidate subject area are obtained respectively, and the corresponding target candidate subject areas are sorted according to the grades of the target candidate subject areas in the same classification, and also the set of target candidate subject areas are obtained according to the sorting result. The target candidate subject areas shown in FIG. 5 are adjusted, and then classifiers based on a depth learning model perform a processing on each unadjusted candidate subject area and each adjusted candidate subject area. The obtained result is shown in FIG. 6, in which a plurality of obtained target candidate subject areas are contained.

In step S204, the target candidate subject areas in each set of the target candidate subject areas are merged to recognize the subject area of the image.

In this embodiment, after obtaining at least one set of the target candidate subject areas, for each set, the target candidate subject areas are merged according to the relations of sizes and of locations between target candidate subject areas.

Figure 6:
FIG. 6 is a sample graph of a result of adjusting and classifying the candidate subject areas shown in FIG. 5.
Figure 7:
FIG. 7 is a sample graph of a result of merging the target candidate subject areas shown in FIG. 5.

As shown in FIG. 6, there are two subjects such that two sets of target candidate subject areas may be obtained. After obtaining two sets of the target candidate subject areas, for each set, the target candidate subject areas are merged according to the relations of sizes and of locations between target candidate subject areas. Specifically, while the target candidate subject areas are merged, for different subjects, the target candidate subject areas corresponding to areas around different subjects are merged, respectively. Specifically, the target candidate subject areas may be merged according to the relations of sizes and of locations between target candidate subject areas. If there is an overlapping area between two target candidate subject areas, the areas may be merged according to their circumscribed rectangles. After the target candidate subject areas shown in FIG. 6 are merged, the subject area of the image is obtained as shown in FIG. 7. The two rectangles shown in FIG. 7 are the subject areas of FIG. 3.

After the subject areas of the image shown in FIG. 3 are obtained, the image may be described, classified, recognized and cut to be shown according to the obtained subject areas of the image. In addition, the image may be cut according to the subject area of the image, and may be put into the searching result webpage such that the searching results may be shown full of facts and pictures.

With the method for recognizing the subject area of the image according to embodiments of the present disclosure, the candidate subject areas are firstly extracted from the image to be recognized, and then the non-subject areas are eliminated from the extracted candidate subject areas such that the target candidate subject areas are obtained, afterwards, the target candidate subject areas are adjusted and classified such that at least one set of target candidate subject areas is obtained. At last, the target candidate subject areas in each set of the target candidate subject areas are merged such that the subject area of the image are obtained, thereby precisely obtaining the subject area of the image and recognizing the subject areas corresponding to the subjects in the image with a plurality of subjects.

In order to achieve the above embodiments, an apparatus for recognizing a subject area of an image according to embodiments of the present disclosure is provided.

Figure 8:
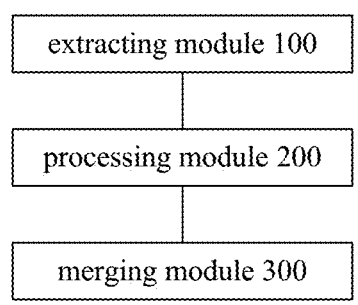
FIG. 8 is a schematic diagram of an apparatus for recognizing a subject area of an image according to an embodiment of the present disclosure.

FIG. 8 is a schematic diagram of an apparatus for recognizing a subject area of an image according to an embodiment of the present disclosure.

As shown in FIG. 8, the apparatus includes an extracting module 100, a processing module 200 and a merging module 300.

The extracting module 100 is configured to receive an image to be recognized and to extract a candidate subject area from the image. The processing module 200 is configured to eliminate a non-subject area from the extracted candidate subject areas to obtain a target candidate subject area and to adjust and classify the target candidate subject areas to obtain at least one set of the target candidate subject areas. The merging module 300 is configured to merge the target candidate subject areas in each set of target candidate subject areas to recognize the subject area of the image.

The processing module 200 is specifically configured to, for each candidate subject area in the set of target candidate subject areas, recognize a current candidate subject area via classifiers with different levels to eliminate the non-subject areas.

Specifically, the processing module 200 may perform a recognizing of the current candidate subject area via cascade classifiers of different levels such that the non-subject areas are eliminated from the candidate subject areas to obtain the target candidate subject areas.

After the target candidate subject areas is obtained via the processing module 200, each current target candidate subject area may be zoomed and/or panned according to the relations of sizes and of locations between a subject and the current target candidate area.

After the target candidate subject areas are adjusted via the processing module 200, a grade and a classification of each unadjusted target candidate subject area and each adjusted target candidate subject area may be obtained by the processing module 200, and the corresponding target candidate subject areas are sorted according to the grade of the target candidate subject areas in the same classification, and also the set of target candidate subject areas are obtained according to the sorting result.

After at least one set of the target candidate subject areas is obtained via the processing module 200, for each set, the target candidate subject areas are merged by the merging module 300 according to the relations of sizes and of locations between the target candidate areas.

The procedure of recognizing the subject area of the image with the apparatus, in which the extracting module 100, the processing module 200 and the merging module 300 are contained, may be shown and described in FIG. 1 or in FIG. 2, which are not elaborated herein.

With the apparatus for recognizing the subject area of the image according to embodiments of the present disclosure, the extracting module extracts the candidate subject areas from the image to be recognized, and then the processing module eliminates the non-subject areas from the extracted candidate subject areas such that the target candidate subject areas are obtained, afterwards, the processing module adjusts and classifies the target candidate subject areas such that at least one set of target candidate subject areas is obtained, and finally the target candidate subject areas in each set of the target candidate subject areas are merged such that the subject area of the image are obtained, thereby precisely obtaining the subject area of the image and recognizing the subject areas corresponding to the subjects in the image with a plurality of subjects.

In order to achieve the above objectives, a storage medium for storing an application program is provided. The application program is configured to execute the methods for recognizing the subject area of the image according to any one of embodiments of the present disclosure.

In order to achieve the above objectives, a device for recognizing a subject area of an image of the present disclosure is provided. The device includes one or more processors, a memory and one or more modules, in which the one or more modules are stored in the memory and configured to perform following operations if the one or more modules are executed by the one or more processors:

In step S101', an image to be recognized is received, and a candidate subject area is extracted from the image.

In step S102', a non-subject area is eliminated from the extracted candidate subject area to obtain a target candidate subject area, and the target candidate subject areas are adjusted and classified to obtain at least one set of the target candidate subject areas.

In step S103', the target candidate subject areas in each set of target candidate subject areas are merged to recognize a subject area of the image.

Reference throughout this specification to "an embodiment," "some embodiments," "one embodiment", "another example," "an example," "a specific example," or "some examples," means that a particular feature or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features or characteristics may be combined in any suitable manner in one or more embodiments or examples. Besides, any different embodiments and examples and any different characteristics of embodiments and examples may be combined without contradiction.

In addition, in the description of the present disclosure, terms such as "first" and "second" are configured herein for purposes of description and are not intended to indicate or imply relative importance or significance. Furthermore, in the description of the present disclosure, "a plurality of" refers to two or more unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

The logic and/or steps described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for recognizing a subject area of an image, comprising:
    receiving an image to be recognized, and extracting candidate subject areas from the image;
    eliminating a non-subject area from the extracted candidate subject areas to obtain target candidate subject areas, and adjusting and classifying the target candidate subject areas to obtain at least one set of the target candidate subject areas; and
    merging the target candidate subject areas in each set of the target candidate subject areas to recognize the subject area of the image, wherein adjusting the target candidate subject areas comprises:
    for each target candidate subject area, performing at least one of zooming and panning on a current target candidate subject area according to relations of sizes and of locations between a subject and a current target candidate subject area.

2. The method according to claim 1, wherein eliminating a non-subject-area from the extracted candidate subject areas comprises:
    recognizing the extracted candidate subject areas via classifiers with different levels to eliminate the non-subject area.

3. The method according to claim 2, wherein classifying the target candidate subject areas comprises:
    obtaining a grade and classification of each unadjusted target candidate subject area and each adjusted target candidate subject area respectively, and sorting the corresponding target candidate subject areas according to the grades of the target candidate subject areas in a same classification, and obtaining the set of target candidate subject areas according to a sorting result.

4. The method according to claim 2, wherein merging the target candidate subject areas in each set of the target candidate subject areas to recognize the subject area of the image comprises:
    merging the target candidate subject areas according to the relations of sizes and of locations between the target candidate subject areas.

5. The method according to claim 1, wherein classifying the target candidate subject areas comprises:
    obtaining a grade and classification of each unadjusted target candidate subject area and each adjusted target candidate subject area respectively, and sorting the corresponding target candidate subject areas according to the grades of the target candidate subject areas in a same classification, and obtaining the set of target candidate subject areas according to a sorting result.

6. The method according to claim 1, wherein merging the target candidate subject areas in each set of the target candidate subject areas to recognize the subject area of the image comprises:
    merging the target candidate subject areas according to the relations of sizes and of locations between the target candidate subject areas.

7. A non-transitory storage medium for storing an application program, wherein the application program is configured to execute a method for recognizing a subject area of an image, the method comprising:
    receiving an image to be recognized, and extracting candidate subject areas from the image;
    eliminating a non-subject area from the extracted candidate subject areas to obtain target candidate subject areas, and adjusting and classifying the target candidate subject areas to obtain at least one set of the target candidate subject areas; and
    merging the target candidate subject areas in each set of the target candidate subject areas to recognize the subject area of the image, wherein adjusting the target candidate subject areas comprises:
    for each target candidate subject area, performing at least one of zooming and panning on a current target candidate subject area according to relations of sizes and of locations between a subject and a current target candidate subject area.

8. A device for recognizing a subject area of an image, comprising:
    one or more processors;
    a memory;
    one or more modules, wherein the one or more modules are stored in the memory and configured to perform following operations if the one or more modules are executed by the one or more processors:
    receiving an image to be recognized, and extracting candidate subject areas from the image;
    eliminating a non-subject area from the extracted candidate subject areas to obtain target candidate subject areas, and adjusting and classifying the target candidate subject areas to obtain at least one set of the target candidate subject areas; and
    merging the target candidate subject areas in each set of target candidate subject areas to recognize the subject area of the image, wherein adjusting the target candidate subject areas comprises:
    for each target candidate subject area, performing at least one of zooming and panning on a current target candidate subject area according to relations of sizes and of locations between a subject and a current target candidate subject area.

9. The device according to claim 8, wherein eliminating a non-subject-area from the extracted candidate subject area comprises:
- recognizing the extracted candidate subject areas via classifiers with different levels to eliminate the non-subject area.

10. The device according to claim 8, wherein classifying the target candidate subject areas comprises:
- obtaining a grade and classification of each unadjusted target candidate subject area and each adjusted target candidate subject area respectively, and sorting the corresponding target candidate subject areas according to the grades of the target candidate subject areas in a same classification, and obtaining the set of target candidate subject areas according to a sorting result.

11. The device according to claim 8, wherein merging the target candidate subject areas in each set of the target candidate subject areas to recognize the subject area of the image comprises:
- merging the target candidate subject areas according to the relations of sizes and of locations between the target candidate subject areas.

\* \* \* \* \*